(12) United States Patent
Sakaguchi et al.

(10) Patent No.: US 8,712,661 B2
(45) Date of Patent: Apr. 29, 2014

(54) DEVICE TO CONTROL FORCE REQUIRED TO DEPRESS ACCELERATOR PEDAL

(75) Inventors: Shigeyuki Sakaguchi, Yokohama (JP); Masao Shiomi, Sagamihara (JP); Masahiro Omori, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/522,844

(22) PCT Filed: Dec. 14, 2010

(86) PCT No.: PCT/JP2010/072456
§ 371 (c)(1),
(2), (4) Date: Jul. 18, 2012

(87) PCT Pub. No.: WO2011/092957
PCT Pub. Date: Aug. 4, 2011

(65) Prior Publication Data
US 2012/0291587 A1    Nov. 22, 2012

(30) Foreign Application Priority Data

Jan. 28, 2010   (JP) ................................. 2010-016247

(51) Int. Cl.
*B60K 26/02*    (2006.01)
(52) U.S. Cl.
USPC .................................. 701/70; 701/79; 701/80
(58) Field of Classification Search
USPC ........................ 701/37, 70; 74/513; 123/399
See application file for complete search history.

(56) References Cited

U.S. PATENT DOCUMENTS

| 7,093,515 | B2 | 8/2006 | Yamanoi et al. |
| 7,457,694 | B2 | 11/2008 | Nijikata |
| 2004/0059482 | A1 | 3/2004 | Hijikata |
| 2006/0106505 | A1 * | 5/2006 | Kuge ................................. 701/1 |
| 2009/0048755 | A1 * | 2/2009 | Tokimasa et al. ............... 701/94 |
| 2010/0250084 | A1 | 9/2010 | Takiguchi et al. |

FOREIGN PATENT DOCUMENTS

| JP | 9-249043 | A | 9/1997 |
| JP | 2003-120339 | A | 4/2003 |
| JP | 2004-106673 | A | 4/2004 |
| JP | 2004-149110 | A | 5/2004 |
| JP | 2005-14710 | A | 1/2005 |
| JP | 2005-132225 | A | 1/2005 |
| JP | 2006-123604 | A | 5/2006 |
| JP | 2006-137305 | A | 6/2006 |
| JP | 2006-168614 | A | 6/2006 |
| JP | 2006-168614 | A | 6/2006 |
| JP | 2006-315570 | A | 11/2006 |
| JP | 2007-76468 | A | 3/2007 |
| JP | 2007-182196 | A | 7/2007 |
| JP | 2008-201231 | A | 9/2008 |
| JP | 4367089 | B2 | 9/2009 |
| JP | 04-367089 | B2 | 11/2009 |
| JP | 04-553057 | B2 | 9/2010 |
| KR | 1989-0003574 | A | 4/1989 |

OTHER PUBLICATIONS

U.S. Appl. No. 13/522,808, filed Jul. 18, 2012, Sakaguchi et al.
S. Sakaguchi et al., USPTO Non-Final Office Action in U.S. Appl. No. 13/522,808, dated Apr. 12, 2013, (15 pages).
Korean Office Action dated Oct. 4, 2013, (5 pgs.).
Sakaguchi et al., USPTO Final Office Action in U.S. Appl. No. 13/522,808, dated Jul. 24, 2013, (11 pages).
Japanese Office Action dated May 14, 2013, (5 pages).
S. Sakaguchi et al., USPTO Final Office Action U.S. Appl. No. 13/522,808 dated Nov. 12, 2013, (7 pgs.).

* cited by examiner

*Primary Examiner* — Helal A Algahaim
*Assistant Examiner* — Charles J Han
(74) *Attorney, Agent, or Firm* — Foley & Lardner LLP

(57) ABSTRACT

In an accelerator pedal effort control apparatus which increases a pedal effort of an accelerator pedal 2 when an accelerator opening angle is larger than a predetermined accelerator opening angle threshold value, in a case where a steering angle of a steering wheel when a vehicle driver starts to increase an opening angle of accelerator pedal 2 is small, a pedal effort increment is a reference pedal effort increment ($\Delta F$) and, in a case where the steering angle is large, is a relatively small pedal effort increment ($\Delta F - \beta$). Thus, when the vehicle turns right or left from a stopped state, pedal effort increment ($\Delta F - \beta$) is set to relatively be small so that a smooth acceleration becomes possible.

11 Claims, 3 Drawing Sheets

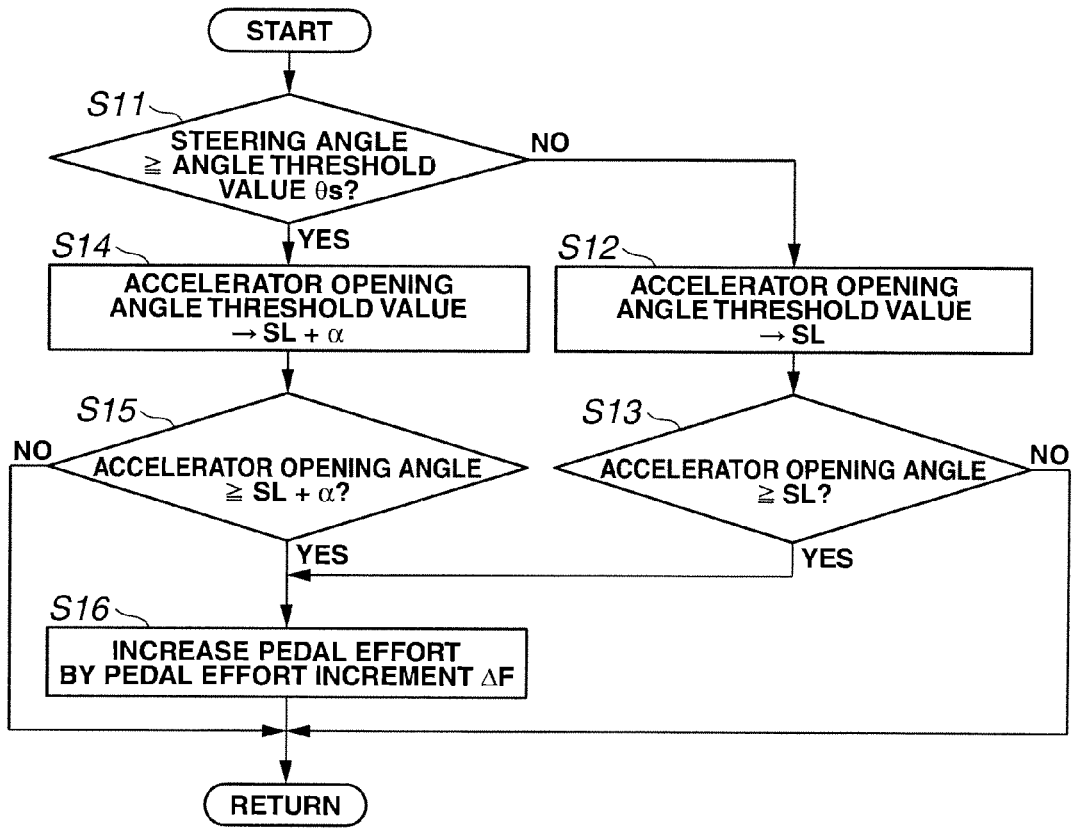
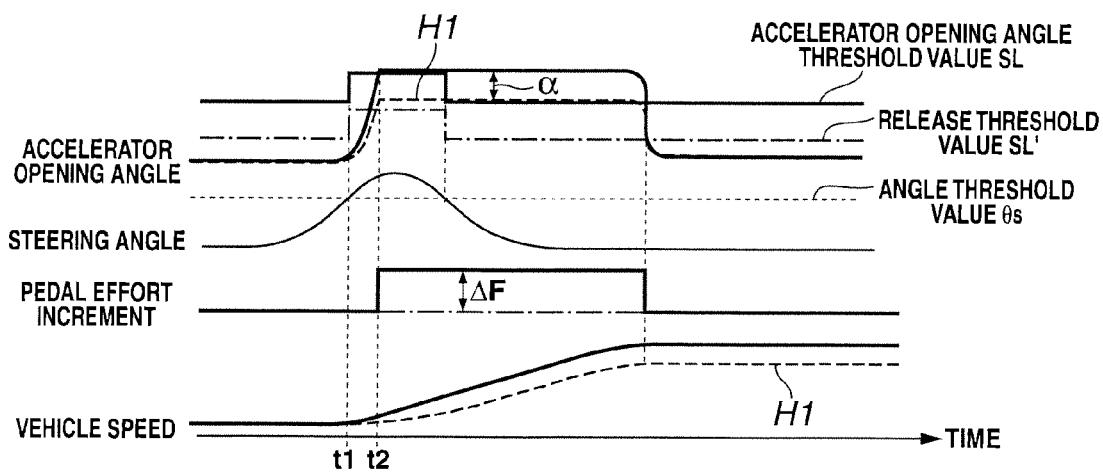

DEVICE TO CONTROL FORCE REQUIRED TO DEPRESS ACCELERATOR PEDAL

TECHNICAL FIELD

The present invention relates to an accelerator pedal effort control apparatus to control a pedal effort of an accelerator pedal of a vehicle.

BACKGROUND ART

Patent document 1 discloses a technology in which the disclosed invention is applied to an engine. In this engine, a switching between a first driving system (for example, a homogenous combustion) at a high-revolution-and-high-load side and a second driving system (for example, a stratified combustion) at a low-revolution-and-low-load side which has a higher fuel efficiency than the first driving system is carried out. When a driving region of the engine is switched from a second driving region in which the second driving system is carried out to a first driving region in which the first driving system is carried out, a depression reaction force (pedal effort) of an accelerator pedal is abruptly increased by a predetermined pedal effort increment, at a stage at which the driving region of the engine enters a boundary driving region immediately before the driving region of the engine is switched to the first driving region.

In addition, this pedal effort increment is released when the driving region is returned from the boundary driving region to the second driving region.

Pre-Published Document

Patent Document 1: Japanese Patent Application First Publication (tokkai) No. 2003-120339.

DISCLOSURE OF THE INVENTION

Problem to be Solved by the Invention

The technology in above-described Patent Document 1 has an object to decrease a reduction in a fuel consumption rate. In addition, with the above-described boundary driving region as a boundary, releases of the pedal effort of the accelerator pedal and the pedal effort increment are carried out. However, the accelerator pedal is a principle manipulation member when a vehicle driver drives the vehicle just as the vehicle driver intended and its operational feeling that the vehicle driver physically experiences and its consequent influence of a vehicle drivability are very important so as to give a direct connection of an evaluation of a quality in the whole vehicle. Hence, when such a kind of pedal effort control apparatus as contributing on the reduction in fuel consumption is made for practical use, it is necessary to coordinate between a reduction of the fuel consumption and the operational feeling of the accelerator pedal and a vehicle operability at a high dimension.

The present inventors have carried out many trials and have repeatedly carried out driving experiments to make such a kind of pedal effort control apparatuses as contributing on the reduction in the fuel consumption for practical use. According to these experiments, it was determined that the vehicle driver excessively feels something wrong on his foot and it is not preferable if the pedal effort is simply increased in accordance with the accelerator opening angle. In details, such a kind of pedal effort control apparatuses as described above abruptly increases the pedal effort of the accelerator pedal in a midway through an acceleration operation by the vehicle driver. Hence, even under a situation of a high acceleration demand, for example, when a right turn from a wait for a light to change or a left turn from the wait for the light to change is made, the acceleration as the driver intended cannot be realized and such a consequence as giving the vehicle driver dissatisfaction is easy to occur. In addition, it is apprehended that there will be some misunderstanding that the riding vehicle is merely a vehicle whose acceleration performance is inferior.

Means for Solving the Problem

Therefore, according to the present invention, in an accelerator pedal effort control apparatus in which, when the accelerator opening angle becomes larger than a predetermined accelerator opening angle threshold value, the pedal effort of an accelerator pedal is increased to be larger than a base pedal effort by a predetermined pedal effort increment, the pedal effort increment or the accelerator opening angle threshold value at which the pedal effort increment is carried out is set with a steering angle of a steering wheel of the vehicle and, in a more broad sense, a running resistance which provides a factor determining an acceleration performance of the vehicle taken into consideration.

That is to say, according to a first invention, the accelerator pedal effort control apparatus sets pedal effort increment in accordance with a running resistance of a vehicle such that the pedal effort increment when the running resistance of the vehicle is large is relatively smaller than the pedal effort increment when the running resistance of the vehicle is small.

In addition, according to a second invention, the accelerate pedal effort control apparatus sets the pedal effort increment in accordance with a steering angle of a steering wheel of the vehicle such that the pedal effort increment when the steering angle of the steering wheel is large is made relatively smaller than the pedal effort increment when the steering angle of the steering wheel is small.

Furthermore, according to a third invention, the accelerator pedal effort control apparatus sets the accelerator opening angle threshold value in accordance with a steering angle of a steering wheel such that the accelerator opening angle threshold value when the steering angle of the steering wheel is large is relatively larger than the accelerator opening angle threshold value when the steering angle of the steering wheel is small It should be noted that, in addition of a use of an actual detection value of the steering angle of the steering wheel, a prediction or an estimation of a variation (increase) of a future steering angle on a basis of an information of a left or right turn of the vehicle according to an operation of either left or right winker or through a car navigation system may be used for "the steering angle of the steering wheel".

Effects of the Invention

Since, according to the present invention, when the vehicle driver depresses the accelerator pedal, the accelerator pedal effort is increased to be larger than the base pedal effort in a region in which the accelerator opening angle is larger than the accelerator opening angle threshold value, an excessive depression of the accelerator pedal is suppressed and the reduction in the fuel consumption can be realized.

Then, under a condition of a large running resistance, typically, under the condition of a large steering angle of the steering wheel, a larger accelerator opening angle is needed for an intention of the vehicle driver to accelerate the vehicle.

Hence, if the accelerator pedal effort is increased, the vehicle driver cannot sufficiently depress the accelerator pedal so that the vehicle cannot accelerate sufficiently. However, according to the present invention, the pedal effort increment at this time becomes small. Hence, an unpleasant feeling such that the driver gives something wrong on his foot due to the increase in the pedal effort can be suppressed and relieved and the acceleration of the vehicle along with the intention of the vehicle driver becomes possible.

BRIEF DESCRIPTION OF THE DRAWINGS

FIG. 4 is a flowchart representing a flow of process of an accelerator pedal effort control in a first embodiment according to the present invention.

FIG. 5 is a timing chart representing time variations of an accelerator pedal opening angle, a steering angle of a steering wheel, a peal effort increment, and a vehicle speed in the first preferred embodiment according to the present invention.

DESCRIPTION OF THE EMBODIMENTS

Preferred embodiments according to the present invention will, hereinafter, be described in details on a basis of the drawings. An accelerator pedal effort control apparatus according to the present invention is, basically, an apparatus to control variably a pedal effort (a reaction force of manipulation) of an accelerator pedal 2 mounted in a vehicle body 1 of the vehicle (not shown). As will be described later, the accelerator pedal effort control apparatus is provided with an accelerator opening angle detector as means for detecting an opening angle (a depression quantity) of accelerator pedal 2 mounted in the vehicle and a pedal effort modification section as means for modifying the pedal effort of accelerator pedal 2 from a base pedal effort and wherein the pedal effort of accelerator pedal 2 is increased than the base pedal effort in a region in which the opening angle of accelerator pedal 2 is larger than a predetermined accelerator opening angle threshold value.

Figure 1:
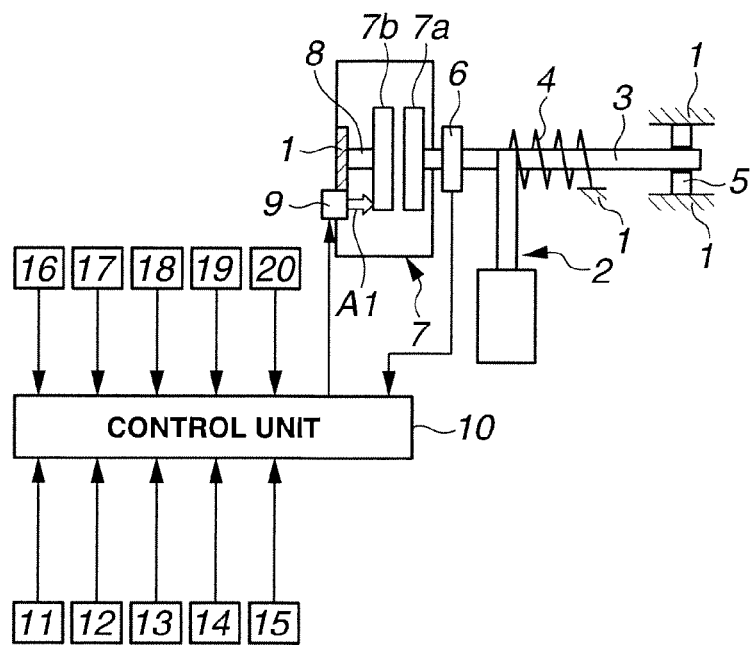
FIG. 1 is an explanatory view of an example of a system configuration of an accelerator pedal effort control apparatus according to the present invention.
Figure 2:
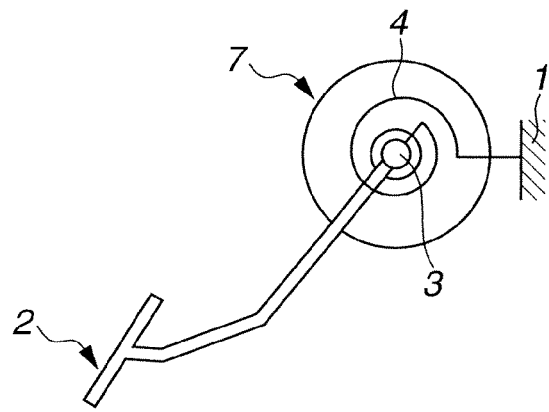
FIG. 2 is an explanatory view diagrammatically representing an example of a pedal effort modification mechanism according to the present invention.

Accelerator pedal 2 is mounted on a rotary axle 3 and is swung with rotary axle 3 as a fulcrum, as shown in FIGS. 1 and 2. The reaction force toward an accelerator close direction is given by means of a return spring 4 of one of various forms. One end of return spring 4 is fixed to vehicle body 1 and the other end of return spring 4 is fixed to rotary axle 3. In addition, one end of rotary axle 3 is rotatably supported on vehicle body 1 via a bearing 5 and an accelerator position sensor 6 is installed as an accelerator opening angle detecting section in the proximity to the other end of rotary axle 3.

It should be noted that, in this embodiment, the depression quantity of accelerator pedal 2 (accelerator opening angle) and the opening angle of the throttle valve (not shown) of an internal combustion engine (not shown) are mutually interlocked so that the opening angle of the throttle valve of the internal combustion engine is increased in accordance with the depression quantity of accelerator pedal 2. In details, a fuel injection quantity (in its turn, a fuel consumption) is increased in accordance with the accelerator opening angle.

Then, the pedal effort modification mechanism includes: a variable friction plate 7 in which a pair of frictional members 7a, 7b which provide a frictional force for the revolution of rotary axle 3. One of the pair of frictional members 7a is mechanically coupled on a terminal section of rotary axle 3 and other of the pair of frictional members 7b is movably in the axial direction of fixture axle 8 and non-rotatably supported on fixture axle 8 via a spline or so forth. Above-described fixture axle 8 is fixedly supported on vehicle body 1. Furthermore, an actuator (for example, an electromagnetic solenoid) 9 which biases above-described frictional member 7b toward frictional member 7a is fixed on vehicle body 1.

Above-described variable friction plate 7 moves frictional member 7b in the axial direction according to the operation of actuator 9 (a direction of an arrow-mark A1 in FIG. 1) so that a frictional force between frictional member 7a and frictional member 7b is variably controlled. The operation of this actuator 9 is controlled by means of a control unit 10. Hence, control unit 10 controls an actuation of actuator 9 so that the friction force given to rotary axle 3, in its turn, the pedal effort of accelerator pedal 2 at a time of the depression of accelerator pedal 2 can be modified.

Control unit 10 inputs signals of various kinds of sensors such as an acceleration sensor 11 which detects a road inclination from an inclination of the vehicle; an atmospheric pressure sensor 12 which detects a surrounding atmospheric pressure of the vehicle; an intake air temperature sensor 13 which detects an intake air temperature; a vehicle speed sensor 14 detecting a vehicle speed; a seat pressure sensor 15 incorporated into a seat of the vehicle to detect whether a vehicle occupant is on a board; a gear position sensor 16 which detects a transmission gear ratio of a transmission; and so forth, in addition to above-described accelerator position sensor 6 detecting the opening angle of accelerator pedal 2. Furthermore, signals from a steering angle sensor 19 detecting a steering angle of a steering wheel of the vehicle and from a winker sensor 20 for detecting an operation of either of a left or right winker are inputted to control unit 10 in addition to the information from a car navigation system 17 from which a map information of the present position of the vehicle and the proximity to the present position is available and the signal from a laser radar 18 which detects an inter-vehicle distance between the vehicle itself and a preceding vehicle.

It should be noted that, for example, a continuously variable transmission which varies continuously a transmission gear ratio can be used as the transmission but an automatic transmission of a type in which a stepwise transmission mechanism is combined with a torque converter or a manual transmission may alternatively be used. It should also be noted that, in a case of the use of the continuously variable transmission, it is possible to determine the transmission gear ratio as a ratio of revolution speeds between an input shaft side thereof and an output shaft side thereof.

Figure 3:
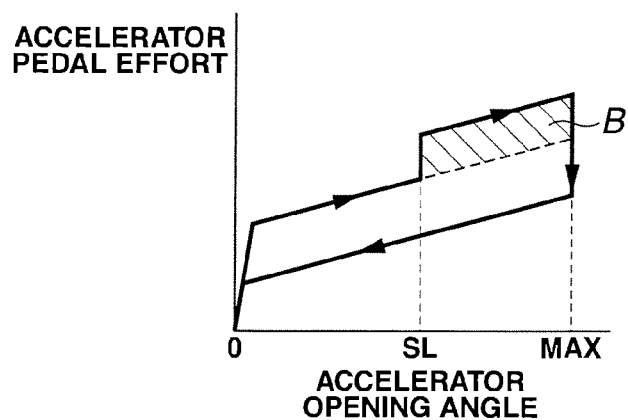
FIG. 3 is a characteristic graph representing one example of a characteristic of an accelerator pedal effort according to the present invention.

FIG. 3 roughly shows a characteristic of the accelerator pedal effort in the above-described embodiment. A basic pedal force, in other words, a base pedal force is increased approximately proportionally to the accelerator opening angle, while an appropriate hysteresis in an opening angle increase direction of accelerator pedal 2 and in an opening angle decrease direction thereof is provided. During an operation of the accelerator pedal in an opening angle increase direction, namely, when, during the depression of accelerator pedal 2, the accelerator opening angle becomes larger than a predetermined accelerator opening angle threshold value (reference sign of SL in FIG. 3), the accelerator pedal effort is increased in a stepwise manner than the base pedal effort.

As described above, since the accelerator pedal effort is increased in the stepwise manner, a more depression of accelerator pedal 2 by the driver is naturally suppressed and, at the same time, such information that the driving state is transferred from a state in which a fuel consumption rate is low (in other words, a fuel economy is good) to a state in which the fuel consumption rate is high (in other words, a fuel economy is bad) can positively be informed to the vehicle driver.

It should be noted that the pedal effort increase of accelerator pedal 2 in above-described accelerator opening angle increase direction may immediately be released when the operation direction of accelerator pedal 2 is reversed or may be released when the accelerator opening angle is decreased to a value equal to or lower than above-described predetermined opening angle.

FIG. 4 shows a flowchart representing a flow of control in this preferred embodiment. At a step S11, control unit 10 determines whether the steering angle of the steering wheel of the vehicle is equal to or larger than a predetermined angle threshold value θs. If the steering angle is smaller than predetermined angle threshold value, the routine goes to a step S12. At step S12, control unit 10 sets an accelerator opening angle threshold value to a predetermined reference value SL set with a fuel consumption performance taken into consideration. Then, if the accelerator opening angle is equal to or larger than this accelerator opening angle threshold value SL, the routine goes from a step S13 to a step S16. At step S16, control unit 10 increases the pedal effort for the base pedal effort by a predetermined pedal effort increment ΔF.

On the other hand, if the steering angle is equal to or larger than predetermined angle threshold value θs, the routine goes to a step S14. At step S14, the accelerator opening angle threshold value is set to a value (SL+α) in which an additional value of α is added to reference value SL. Then, if the accelerator opening angle becomes equal to or larger than accelerator opening angle threshold value (SL+α) after the increase, the routine goes from a step S15 to step S16 in which the pedal effort is increased for the base pedal effort by predetermined pedal effort increment ΔF.

According to this embodiment, as shown in FIG. 5, under a situation such that the opening angle of accelerator pedal 2 is increased while the steering angle is increased, for example, during the left turn or the right turn from a stop state such as a case of a wait for the traffic signal to change, the steering angle threshold value is modified to the value at the increment side (SL+α) at a time point t1 at which the steering angle exceeds angle threshold value θs. Hence, the increase in the pedal effort to a time point t2 at which the accelerator opening angle is relatively large does not occur and a quick depression of accelerator pedal 2 only by the base pedal effort is allowed.

Thus, a smooth vehicle acceleration becomes possible, as compared with a characteristic H1 (a characteristic denoted by a broken line in FIG. 5) of a first comparative example in which the accelerator opening angle threshold value is not modified in accordance with the steering angle.

It should be noted that release threshold value SL' to release the pedal effort increment is preset to a value lower than accelerator opening angle threshold value SL but, in this embodiment, this release threshold value SL' is also set in accordance with angle threshold value θs of the steering wheel of the vehicle. In other words, if the steering angle of the steering wheel is equal to or larger than angle threshold value θs, release threshold value SL' is set to be relatively large in the same way as accelerator opening angle threshold value SL so as to maintain the hysteresis between accelerator opening angle threshold value SL and release threshold value SL' at the same level.

Figure 6:
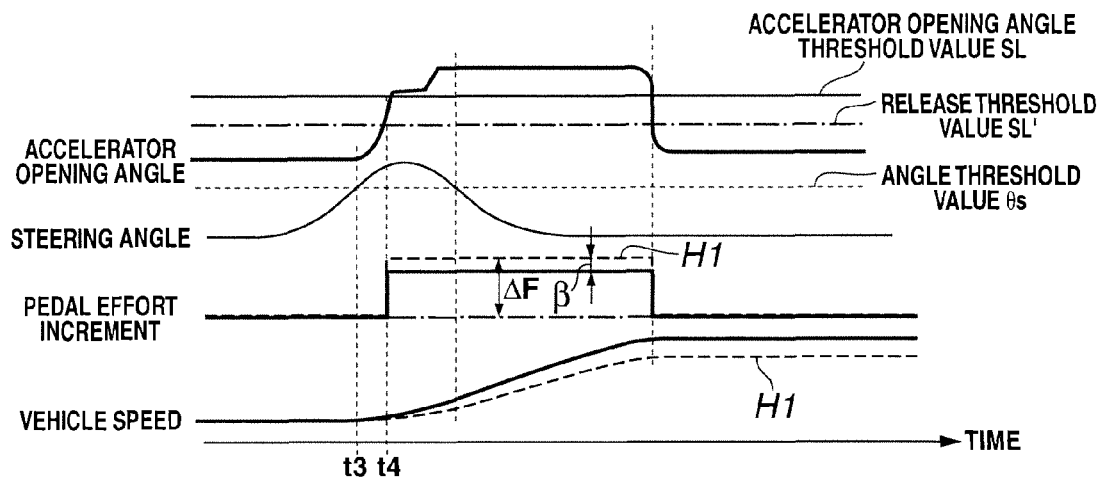
FIG. 6 is a timing chart representing the time variations of the accelerator pedal opening angle, the steering angle of the steering wheel, the pedal effort increment, and the vehicle speed in a second preferred embodiment according to the present invention.

Next, a second preferred embodiment according to the present invention will be explained with reference to FIGS. 6 and 7. In the second embodiment, pedal effort increment ΔF of accelerator pedal 2 is set in accordance with the steering angle of the steering wheel, in place of the accelerator opening angle threshold value in the first embodiment. That is to say, the pedal effort increment is modified in accordance with the steering angle of the steering wheel in such a way that pedal effort increment (ΔF−β) when the steering angle of the steering wheel is large is smaller by a predetermined quantity β than a base pedal effort increment ΔF when the steering wheel is small. More specifically, when the steering angle of the steering wheel is equal to or larger than predetermined angle threshold value θs, the pedal effort increment is decreased to be smaller than a preset predetermined reference value ΔF by predetermined decrement β.

According to the second embodiment, under the situation such that the opening angle of accelerator pedal 2 is increased while the steering angle of the steering wheel is increased, for example, in a case where the vehicle turns right or left from a time at which the vehicle is stopped to wait for the traffic signal to change, at a time point t3 at which the steering angle exceeds predetermined angle threshold value θs and at a time point t4 at which the accelerator opening angle exceeds accelerator opening angle threshold value SL, the increase in the pedal effort is carried out and the pedal effort increment, at this time, is modified to a lower value (ΔF−β). Thus, an impression such as the pedal effort increment can be suppressed and relieved and a smooth vehicular acceleration becomes possible as compared with characteristic H1 of the comparative example in which the pedal effort increment is not modified in accordance with the steering angle.

Figure 7:
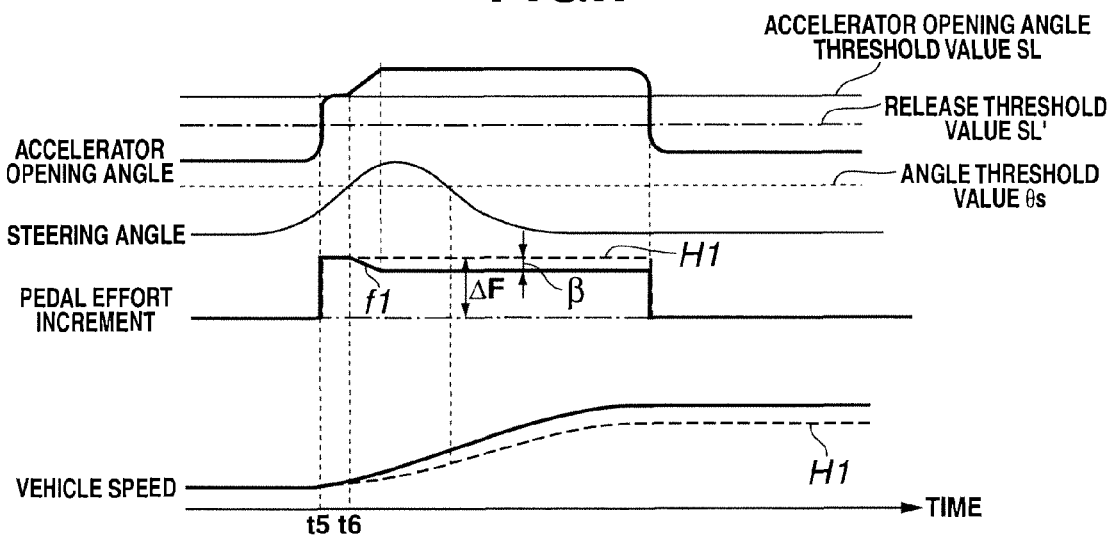
FIG. 7 is a timing chart in a case where the steering angle of the steering wheel is increased after the increase in the accelerator opening angle in the second embodiment described above.

In addition, it should be noted that, in the above-described second embodiment, as shown in FIG. 7, in a case where the steering angle of the steering wheel exceeds predetermined angle threshold value θs from the time at which the accelerator opening angle has exceeded accelerator opening angle threshold value SL in such a case where, for example, the steering wheel is steered largely after the acceleration when the vehicle is in a stopped state and the vehicle turns in the leftward or rightward direction from a vehicle stopped state, basic pedal effort increment ΔF is given at a time point t5 at which the accelerator opening angle exceeds accelerator opening angle threshold value θs. Thereafter, at a time point of t6 at which the steering angle exceeds predetermined angle threshold value θs, pedal effort increment (ΔF−β) may be made small. In this case, the pedal effort increment is gradually reduced by limiting a variation rate (a variation speed) of the pedal effort increment to a predetermined value preferably as denoted by a reference sign f1 in FIG. 7 so as not to give the driver the unpleasant feeling such that the vehicle driver feels something wrong on this foot against the accelerator pedal.

It should be noted that both of the first embodiment and the second embodiment may be combined. That is to say, when the steering angle of the steering wheel (running resistance) is large, the accelerator opening angle threshold value may be made large and, at the same time, the pedal effort increment may be made small.

In addition, either the accelerator opening angle threshold value or the pedal effort increment, both serving to increase the pedal effort of accelerator pedal 2, may be modified in accordance with the vehicle speed when the opening angle of accelerator pedal 2 in response to a manipulation of the driver is started to increase (in other words, the vehicle speed at an initial stage when the depression is carried out from a complete closure of the accelerator opening angle or from a certain constant intermediate opening angle of accelerator pedal 2). In more details, in a case where the vehicle speed when the opening angle of accelerator pedal 2 is started to be increased is low, the accelerator opening angle threshold value or the pedal effort increment is set to the value of (SL+α) which is relatively large as compared with the case of the high vehicle speed or set to the value of (ΔF−α) which is relatively small as compared with the case of the high vehicle speed. Thus, the accelerator pedal becomes easy to be depressed in a case where the vehicle speed is low, for example, under the situation that the vehicle turns right or left from the vehicle stopped state, the acceleration of the vehicle along with the intention of the vehicle driver becomes possible.

From the operation state of either left or right winker and an information on the car navigation system 17, a variation (increase) of the steering wheel may, in advance, be predicted and a setting of the accelerator opening angle threshold value or pedal effort increment may be carried out. In other words, during the operation of either the left or right winker and during the left or the right turn guide by means of car navigation system 17, expecting that the steering wheel is manipulated so that the steering angle is increased, the accelerator opening angle is preset to be large or the pedal effort increment is set to be small. In this case, even if the accelerator opening angle is increased before the driver manipulates the steering angle at the time of the left or right turn from the stopped state, the accelerator opening angle threshold value can, from the first, be set to be large or the pedal effort increment can be set to be small. Thus, the quicker vehicular acceleration along with the intention of the vehicle driver can become possible.

On the other hand, when the steering angle of the steering wheel is increased without operation of the left or right winker in such a case where the vehicle is garaged, the acceleration demand (acceleration intention) is low as compared with the right or left turn of the vehicle as described above, the modification of the accelerator opening angle threshold value and/or the pedal effort increment in accordance with the steering angle may be inhibited. In other words, only during the right or left turn from the stopped state, the modification of the accelerator opening angle threshold value or the pedal effort increment in accordance with the steering angle as described above may be carried out.

In addition, when the vehicle turns toward an opposite traffic lane direction, in such a case as the right turn when the vehicle is traveling on a left traffic lane in a left traffic traveling system, the right turn needs to be speedily completed before an opposing vehicle enters the opposite traffic lane as compared with the turn of the vehicle on the traveling traffic lane so that a high acceleration demand occurs. Hence, in this case, when the vehicle turns toward the opposite traffic lane direction, it is preferable to set the accelerator opening angle threshold value to be relatively large or to set pedal effort increment to be relatively small as compared with the case where the vehicle turns toward the traffic lane direction.

Figure 8:
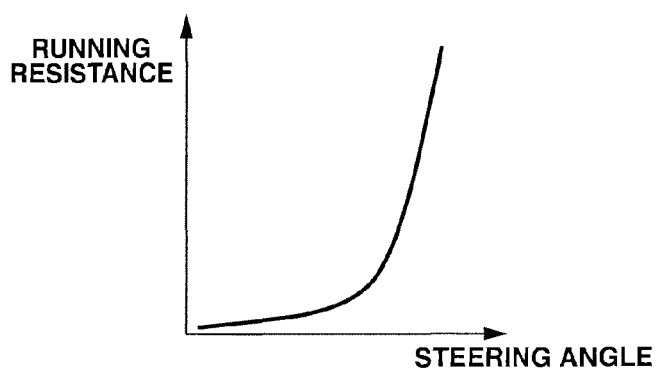
FIG. 8 is a characteristic graph representing the relationship between the steering angle of the steering wheel and a running resistance.

FIG. 8 shows a relationship between the steering angle of the steering wheel and the running resistance. As shown in FIG. 8, there is such a relationship that, as the steering angle becomes large to some degree, the running resistance becomes abruptly large. Therefore, the modification of the accelerator opening angle threshold value or the pedal effort increment in accordance with parameter(s) related to the running resistance may be made, in addition to the steering angle of the steering wheel described above. Specifically, in order to avoid an excessive pedal effort increment in spite of the large running resistance of the vehicle, the pedal effort increment may be set in accordance with the running resistance such that the pedal effort increment when the running resistance of the vehicle is large becomes relatively smaller than the pedal effort increment when the running resistance of the vehicle is small.

The running resistance of the vehicle is large in a case where a gradient of a road (an ascending slope is taken as a positive) is large or in a case where a mount weight of the vehicle according to a number of vehicle occupants is large, in addition to the vehicle speed described above and as one of the parameters representing the running resistance. Hence, the pedal effort increment in a case where the gradient is large may be set to be relatively smaller than the pedal effort increment in a case where the gradient is small or the pedal effort increment in a case where the mount weight is large may be set to be relatively smaller than the pedal effort increment in a case where the mount weight is small. It should be noted that the magnitude of the running resistance according to these parameters may be used in place of the running resistance based on the vehicle speed (mainly an air resistance or a rolling resistance) or, alternatively, the magnitude of the running resistance based on the vehicle speed may be used in place of the running resistance.

It should be noted that the gradient of a road can be detected using a detection value of acceleration sensor 11. In a case where a road map information of the present position and its surrounding is available from car navigation system 17, it is also possible to detect the gradient of the road at the present location on a basis of this map information. The number of occupants of the vehicle can be detected from the signals of seat pressure sensors 15 incorporated into the seats.

The pedal effort increment set on a basis of the running resistance of the vehicle can, further, be corrected according to the other conditions. The pedal effort increment can be corrected using, for example, an air density of intake air of the internal combustion engine, a driving mode of a sport mode or an economy mode, an inter-vehicle distance between the vehicle itself and the preceding vehicle, a speed difference from the present vehicle speed to a legal speed limit, and so forth.

The correction according to the air density is to compensate for the reduction in an output of the internal combustion engine along with the reduction of the air density in such a case of a high land having a high elevation or in a case of a high ambient temperature. As the air density becomes smaller, the pedal effort increment is made smaller with the reduction in the output of the internal combustion engine taken into consideration. It should, herein, be noted that the elevation of the present location of the vehicle can be calculated using the detection value of atmospheric pressure sensor 12 and in a case where the map information of the present position of the vehicle and its surrounding is available from car navigation system 17, it is possible to detect the elevation of the present location on a basis of the map information. It is possible to detect the ambient temperature utilizing the detection value of intake air temperature sensor 13. It should be noted that the air density may directly be determined from the detection value of atmospheric pressure sensor 12.

The correction according to the driving mode is as follows. That is to say, in a case where the present driving mode is the driving mode in which the acceleration demand of the vehicle driver is high, the pedal effort increment is set to be small so that the acceleration along with the intention of the vehicle driver is carried out. It should be noted that a shift pattern of, for example, an automatic transmission is modified in accordance with the selection of the driving mode, as is well known.

A determination of the driving mode of the vehicle is as follows. That is to say, in a case where, for example, a selection switch of driving mode is attached onto the vehicle, the driving mode can easily be determined from a position of this selection switch. In a case where one of the driving modes having the high acceleration demand is selected according to a switch operation by the vehicle driver (for example, the sport mode), the pedal effort increment may be made small. In addition, with a driving tendency of the vehicle driver learned from a past driving situation of the driver, a driving style that the vehicle driver prefers is determined to be the driving style having a large acceleration demand so that the determination may be made that the driving mode having the high acceleration demand is steadily selected.

The correction according to the inter-vehicle distance between the vehicle itself and the preceding vehicle is as follows. That is to say, as the inter-vehicle distance becomes larger, the pedal effort increment is corrected so that, as the inter-vehicle distance becomes larger, the pedal effort increment is made to be smaller and, when the inter-vehicle distance is small, the pedal effort increment is made to be relatively large. The inter-vehicle distance between the vehicle itself and the preceding vehicle is detected by means of an inter-vehicle distance detecting device using laser radar 18. This inter-vehicle distance detecting device radiates a laser light toward a front direction of the vehicle and receives a reflected light form the preceding vehicle to detect the distance from the preceding vehicle.

The correction according to a difference between the present vehicle speed and the legal speed limit of a road on which the vehicle is presently running (provided that the present vehicle speed is lower than a legal speed limit) is as follows. That is to say, the map information of the present position of the vehicle and the surrounding thereof is obtained from car navigation system 17, the legal speed limit of the road on which the vehicle is presently running is detected from the map information. Then, in a case where the present vehicle speed is smaller than the legal speed limit of the road on which the vehicle is presently running, the pedal effort increment can be corrected to be smaller as the speed difference to the legal speed limit becomes larger. This is because the acceleration up to the legal speed limit is made smooth and, on the other hand, the acceleration of the vehicle to the legal speed limit or higher can be made difficult.

As described above, the pedal effort increment determined from the running resistance is, furthermore, corrected according to the air density, the driving mode, the inter-vehicle distance to the preceding vehicle, a difference between the present vehicle speed and the legal speed limit, and so forth. Thus, a more appropriate pedal increase of accelerator pedal 2 can be increased so that a smooth driving which reflects the intention of the vehicle driver can be realized.

It should be noted that, in the above-described embodiment, the accelerator opening angle threshold value or the pedal effort increment is modified in the stepwise manner in a case where the steering angle of the steering wheel is large. However, the present invention is not limited to this. An angle of road wheels which varies in accordance with the steering angle of the steering wheel may be detected and used for the above-described setting. In addition, a replaceable use of another parameter such as the vehicle speed related to the above-described running resistance or the combination of the vehicle speed and the other parameter may be used.

In addition, in either of the above-described embodiments, the accelerator opening angle threshold value or the pedal effort increment is modified in the stepwise manner in a case where the steering angle of the steering wheel is large. However, the accelerator opening angle threshold value or the pedal effort increment may continuously be modified in such a way that, as the steering angle of the steering wheel becomes larger, the accelerator opening angle threshold value is gradually increased or the pedal effort increment is gradually decreased.

Furthermore, with the vehicle speed at the initial stage of an opening angle increase operation of accelerator pedal 2 by the vehicle driver (the depression from the complete closure state or the depression from the intermediate opening angle) as a reference, the accelerator opening angle threshold value or the pedal effort increment is set. However, the vehicle speed during the increment of the opening angle of accelerator pedal 2 may be read sequentially and, whenever the read of the vehicle speed is made, the accelerator opening angle threshold value or the pedal effort increment may be set and updated.

It should be noted that, the pedal effort increment is carried out on a basis of the accelerator opening angle related to the fuel consumption, in each of the above-described embodiments. However, the threshold value may be set for the fuel consumption rate itself. Then, the present invention is equally applicable to a case where the pedal effort increment is carried out when an instantaneous fuel consumption rate exceeds its threshold value.

In each of the above-described embodiments, the position of accelerator pedal 2 (depression quantity) itself is detected as the accelerator opening angle. Hence, although the depression quantity of accelerator pedal 2 has substantially the same meaning as the accelerator opening angle, it is possible to perform the control, according to the present invention, with the opening angle of, for example, a throttle valve which is interlocked with the accelerator pedal used, as the accelerator opening angle.

It should be noted that the accelerator pedal effort control apparatus according to the present invention cannot only be applied to the vehicle with the internal combustion engine as only a drive source but also can be applied to, for example, an electric automotive vehicle, a hybrid vehicle, or so forth.

The invention claimed is:

1. An accelerator pedal effort control apparatus for a vehicle, the accelerator pedal effort control apparatus comprising:
   an accelerator opening angle detecting section configured to detect an accelerator opening angle; and
   a pedal effort modification section configured to modify a pedal effort of an accelerator pedal,
   wherein the accelerator pedal effort control apparatus is configured such that, when the accelerator pedal opening angle becomes larger than a predetermined accelerator opening angle threshold value and a running resistance of the vehicle is in a first range, the pedal effort modification section increases the pedal effort of the accelerator pedal to be larger than a base pedal effort by a first predetermined pedal effort increment, and wherein the accelerator pedal effort control apparatus is configured such that, when the accelerator pedal opening angle becomes larger than the predetermined accelerator opening angle threshold value and the running resistance of the vehicle is in a second range that is higher than the first range, the pedal effort modification section increases the pedal effort of the accelerator pedal to be larger than the base pedal effort by a second predetermined pedal effort increment that is lower than the first predetermined pedal effort increment.

2. The accelerator pedal effort control apparatus as claimed in claim 1, wherein the accelerator pedal effort control apparatus is configured to set the pedal effort increment in accordance with a steering angle of a steering wheel of the vehicle such that the pedal effort increment when the steering angle of the steering wheel is large is made relatively smaller than the pedal effort increment when the steering angle of the steering wheel is small.

3. The accelerator pedal effort control apparatus as claimed in claim 1, wherein the accelerator pedal effort control apparatus is configured to set the pedal effort increment when a vehicle speed is low to be relatively small as compared with the pedal effort increment when the vehicle speed is high.

4. The accelerator pedal effort control apparatus as claimed in claim 1, wherein the accelerator pedal effort control apparatus is configured to detect an operation state of either one of left and right winkers and is configured to set the pedal effort increment to be relatively small as compared with the pedal effort increment when each of the left and right winkers is in a non-operation state.

5. The accelerator pedal effort control apparatus as claimed in claim 1, wherein the accelerator pedal effort control apparatus sets the pedal effort increment when a left or right turn guide through a car navigation system of the vehicle is carried out to be relatively small as compared with the pedal effort increment when neither the left nor right turn guide through the car navigation system is carried out.

6. The accelerator pedal effort control apparatus as claimed in claim 1, wherein the accelerator pedal effort control apparatus is configured to detect whether either one of left and right winkers is operated and is configured to inhibit a modification of the pedal effort increment in accordance with a steering angle when each of the winkers is in a non-operation state.

7. The accelerator pedal effort control apparatus as claimed in claim 1, wherein the accelerator pedal effort control apparatus is configured to set the pedal effort increment when the vehicle is turned toward a direction of an opposite traffic lane to be relatively small as compared with the pedal effort increment when the vehicle is turned toward another traveling traffic lane.

8. The accelerator pedal effort control apparatus as claimed in claim 1, wherein the accelerator pedal effort control apparatus is configured to detect a surrounding air density and is configured to set the pedal effort increment when the air density is low to be relatively small as compared with the pedal effort increment when the air density is high.

9. The accelerator pedal effort control apparatus as claimed in claim 1, wherein the accelerator pedal effort control apparatus is configured to detect an acceleration demand by a vehicle driver and is configured to set the pedal effort increment when the acceleration demand is high to be relatively small as compared with the pedal effort increment when the acceleration demand is low.

10. The accelerator pedal effort control apparatus as claimed in claim 1, wherein the accelerator pedal effort control apparatus is configured to set the accelerator opening angle threshold value in accordance with a steering angle of a steering wheel such that the accelerator opening angle threshold value when the steering angle of the steering wheel is large is relatively larger than the accelerator opening angle threshold value when the steering angle of the steering wheel is small.

11. An accelerator pedal effort control apparatus, comprising:

an accelerator pedal opening angle detecting section configured to detect an accelerator opening angle; and a pedal effort modification section configured to modify a pedal effort of an accelerator pedal, wherein the accelerator pedal effort control apparatus is configured such that, when the accelerator pedal opening angle becomes larger than a predetermined accelerator opening angle threshold value and a steering angle of a steering wheel of the vehicle is in a first range, the pedal effort modification section increases the pedal effort of the accelerator pedal to be larger than a base pedal effort by a first predetermined pedal effort increment, and wherein the accelerator pedal effort control apparatus is configured such that, when the accelerator pedal opening angle becomes larger than the predetermined accelerator opening angle threshold value and the steering angle of the steering wheel of the vehicle is in a second range that is higher than the first range, the pedal effort modification section increases the pedal effort of the accelerator pedal to be larger than the base pedal effort by a second predetermined pedal effort increment that is lower than the first predetermined pedal effort increment.

* * * * *